(12) United States Patent
Hamilton et al.

(10) Patent No.: US 10,989,547 B2
(45) Date of Patent: Apr. 27, 2021

(54) AUTONOMOUS VEHICLE RIDE SERVICE SYSTEMS AND METHODS

(71) Applicant: Ford Global Technologies, LLC, Dearborn, MI (US)

(72) Inventors: Kathryn Hamilton, West Bloomfield, MI (US); Michael Awad Alla, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/167,276

(22) Filed: Oct. 22, 2018

(65) Prior Publication Data
US 2020/0124428 A1   Apr. 23, 2020

(51) Int. Cl.
| | | |
|---|---|---|
| G01C 21/00 | (2006.01) | |
| G01C 21/34 | (2006.01) | |
| G05D 1/00 | (2006.01) | |
| G06Q 50/30 | (2012.01) | |
| G06K 9/00 | (2006.01) | |
| B60W 30/06 | (2006.01) | |
| G06Q 10/02 | (2012.01) | |

(52) U.S. Cl.
CPC ......... *G01C 21/3438* (2013.01); *B60W 30/06* (2013.01); *G05D 1/0027* (2013.01); *G05D 1/0088* (2013.01); *G06K 9/00812* (2013.01); *G06Q 10/02* (2013.01); *G06Q 50/30* (2013.01); *G05D 2201/0213* (2013.01)

(58) Field of Classification Search
CPC . G01C 21/3438; B60W 30/06; G05D 1/0027; G05D 1/0088; G05D 2201/0213; G06K 9/00812; G06Q 10/02; G06Q 50/30

USPC ........................................................ 701/410
See application file for complete search history.

(56) References Cited

U.S. PATENT DOCUMENTS

| | | | |
|---|---|---|---|
| 9,829,322 B2 | 11/2017 | Lee | |
| 2014/0309806 A1* | 10/2014 | Ricci | G06Q 10/02 701/1 |
| 2017/0153714 A1 | 6/2017 | Gao et al. | |

(Continued)

OTHER PUBLICATIONS

Bajaj, et al.,"Engineering Safety with Uber's Real-Time ID Check," Uber Engineering Blog. Published Mar. 13, 2017, pp. 1-12. https://eng.uber.com/real-time-id-check/.

*Primary Examiner* — James M McPherson
*Assistant Examiner* — Tiffany P Ohman
(74) *Attorney, Agent, or Firm* — Brandon Hicks; Eversheds Sutherland (US) LLP

(57) ABSTRACT

Exemplary embodiments of systems and methods described in this disclosure generally pertain to a ride service that includes an autonomous vehicle configured to execute various functions autonomously for assisting customers. An exemplary autonomous vehicle of the ride service may be configured to autonomously execute one or more functions such as identifying a customer upon arriving at a pick-up location, finding a suitable parking spot close to the customer, guiding the customer (such as a visually impaired customer) to the autonomous vehicle, positioning a particular door of the autonomous vehicle to facilitate entry into the autonomous vehicle by the customer, and/or providing an assigned seat to the customer upon entry into the autonomous vehicle. In at least some cases, the customer may be a physically handicapped individual in need of certain types of assistance offered by the autonomous vehicle.

6 Claims, 5 Drawing Sheets

(56) References Cited

U.S. PATENT DOCUMENTS

2017/0316696 A1   11/2017  Bartel
2018/0074494 A1    3/2018  Myers et al.
2020/0074065 A1*  3/2020  Zhang ................ G06K 9/00355
2020/0111370 A1*  4/2020  Dyer ...................... G08G 1/205

* cited by examiner

AUTONOMOUS VEHICLE RIDE SERVICE SYSTEMS AND METHODS

FIELD OF THE DISCLOSURE

This disclosure generally relates to ride services, and more particularly relates to ride services using one or more autonomous vehicles.

BACKGROUND OF THE DISCLOSURE

Ride services such as Uber™ and Lyft™ have proliferated over the last few years. Most of the automobiles used for providing these ride services are driven by human drivers. However, self-driven vehicles, often referred to as autonomous vehicles, have become the focus of a number of development efforts lately and various ride service companies are considering the use of these vehicles for providing ride services. It is foreseeable that one or more of these ride service companies may include a fleet of autonomous vehicles and respond to a customer ride request by dispatching one of the autonomous vehicles to a pick-up location specified by the customer. The equipment generally provided in an autonomous vehicle may enable the autonomous vehicle to travel to the pick-up location from a location at which the autonomous vehicle is currently located. However, upon approaching the pick-up location, a busy street corner for example, the autonomous vehicle may encounter difficulties in identifying the customer from amongst a number of people who may be present at the street corner, and may also be unable to assist the customer in identifying and boarding the autonomous vehicle. The problem is exacerbated when the customer is physically handicapped and may need one or more forms of assistance to locate and board the autonomous vehicle. It would therefore be helpful if the autonomous vehicle had certain capabilities to execute such tasks that are often intuitive and taken for granted when performed by a human driver.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE DISCLOSURE

Figure 1:
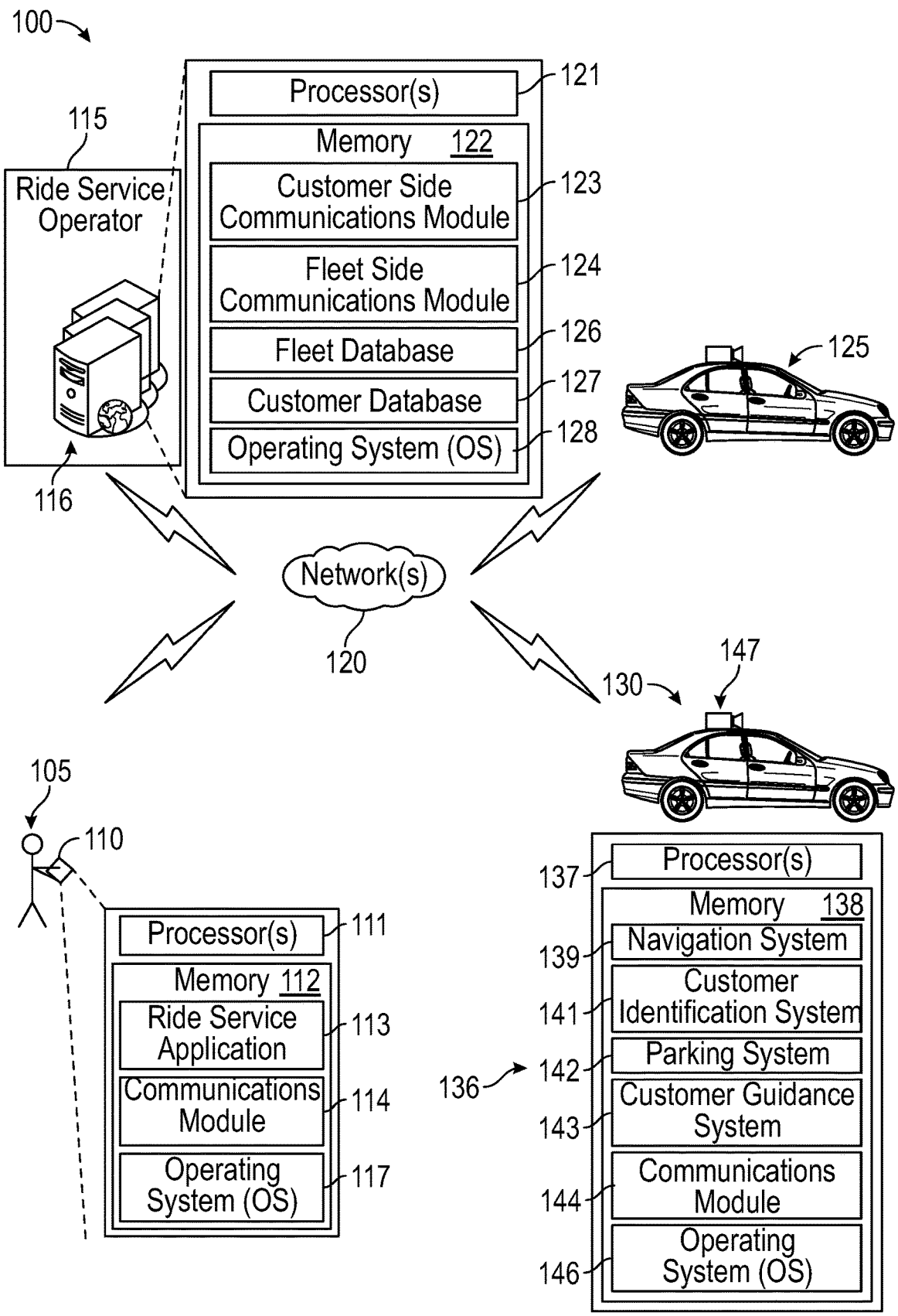
FIG. 1 illustrates a system for operating a ride service using one or more autonomous vehicles in accordance with various embodiments of the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the word "customer" as used herein refers to a person who is seeking to use a ride service. The customer may be referred to in alternative form as a "user" of a user device, or a "passenger" after the customer has entered an autonomous vehicle. As another example, the "user device" may be alternatively referred to as a "communication device." As yet another example, the label "autonomous vehicle" as used herein may be understood in various other ways such as "autonomously drive vehicle" or a "self-driving vehicle." Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments of the systems and methods described in this disclosure are directed to a ride service that includes an autonomous vehicle configured to execute various functions autonomously for assisting customers. An exemplary autonomous vehicle of the ride service may be configured to autonomously execute one or more functions such as identifying a customer upon arriving at a pick-up location, finding a suitable parking spot close to the customer, guiding the customer (such as a visually impaired customer) to the autonomous vehicle, positioning a particular door of the autonomous vehicle to facilitate entry into the autonomous vehicle by the customer, and/or providing an assigned seat to the customer upon entry into the autonomous vehicle. In at least some cases, the customer may be a physically handicapped individual in need of certain types of assistance offered by the autonomous vehicle.

FIG. 1 illustrates a system 100 for operating a ride service using one or more autonomous vehicles in accordance with one or more embodiments of the disclosure. The system 100 may include a ride service operator 115 who uses a computer system 116 to execute various operations of a ride service. The computer system 116 may include several types of computers such as servers and clients, that may be communicatively coupled to each other via a network such as a local area network (LAN) or a wide area network (WAN). The system 100 may also include one or more autonomous vehicles, such as an autonomous vehicle 125 and an autonomous vehicle 130 that are shown in FIG. 1 for purposes of illustration. One or more customers, such as a customer 105, may communicate with the ride service operator 115 via a network 120. The network 120 may include any one or a combination of various networks, such as a telephone network, a cellular network, a cable network, a wireless network, and/or private/public networks such as the Internet. In some instances, the network 120 may support communication technologies such as Bluetooth, cellular, near-field communication (NFC), Wi-Fi, and/or Wi-Fi direct.

In at least some embodiments, the customer 105 is a physically handicapped individual such as an individual who is visually impaired, hard of hearing, or missing one or more limbs. In some other embodiments, the customer 105 is an able-bodied individual. The customer 105 may make a ride request to the ride service operator 115 to be picked up at one location and transported to another location. The ride request may be carried out in various ways, such as by placing a voice call to the ride service operator 115 or by using a ride service application 113 provided to the customer 105 by the ride service operator 115. Upon receiving the ride request, the ride service operator 115 may designate the autonomous vehicle 130 to provide the requested ride and may then place the customer 105 in communicative contact with the autonomous vehicle 130. The customer 105 may then communicate with the autonomous vehicle 130 by using the ride service application 113. The customer 105 and the autonomous vehicle 130 will be used henceforth for purposes of description but it should be understood that the description is equally applicable to one or more other customers and one or more other autonomous vehicles in accordance with the disclosure.

The customer 105 may use a communication device 110 to communicate with the ride service operator 115 and/or the autonomous vehicle 130. The communication device 110 may be any of various types of portable devices such as a smartphone running the ride service application 113 provided by the ride service operator 115 or a laptop running an application customized for using the ride service provided by the ride service operator 115. The communication device 110 may include several components such as a processor 111 and a memory 112. The memory 112, which is one example of a non-transitory computer-readable medium, may be used to store an operating system 117 and various code modules such as a communications module 114 and the ride service application 113.

One or more computers of the computer system 116 that is used by the ride service operator 115 may include several components such as a processor 121 and a memory 122. The memory 122, which is another example of a non-transitory computer-readable medium, may be used to store an operating system 128 and various other code modules such as a customer side communications module 123, a fleet side communications module 124, a fleet database 126, and a customer database 127. The customer side communications module 123 may be used by the ride service operator 115 to communicate with various customers such as the customer 105. The communications can be carried out in machine-to-machine form when the computer system 116 of the ride service operator 115 is communicating with the communication device 110 of the user 105. The machine-to-machine communications may take place for example between the computer system 116 and the ride service application 113 in the communication device 110 of the customer 105. Communications between the computer system 116 and the communication device 110 may be complemented in some cases by human-to-machine communications (voice-controlled applications), or by human-to-human communications between the customer 105 and the ride service operator 115.

The fleet side communications module 124 may be used by the ride service operator 115 to communicate with the autonomous vehicles and/or driver-operated vehicles in the fleet. The communications between the fleet side communications module 124 and a computer system 136 located in the autonomous vehicle 130 for example, may be carried out in the form of machine-to-machine communications. The machine-to-machine communications may be directed at executing various functions such as providing information and/or instructions to the autonomous vehicle 130 regarding a ride requested by the customer 105, queries relating to one or more conditions of the autonomous vehicle 130, queries relating to a status of the autonomous vehicle 130, and/or for operating as an intermediary between the customer 105 and the autonomous vehicle 130.

The fleet database 126 may include various types of information relating to the various cars (autonomous and/or driver operated) in the fleet operated by the ride service operator 115. For example, the fleet database 126 may include information pertaining to a seating capacity in the autonomous vehicle 130, an availability of the autonomous vehicle 130 for responding to a ride request, suitability of the autonomous vehicle 130 to provide service to physically impaired customers, and/or a seat assignment provided to the customer 105.

The customer database 127 may include various types of information relating to existing customers, new customers, and/or potential customers of the ride service provided by the ride service operator 115. For example, the customer database 127 may include information pertaining to a physical impairment of the customer 105, a type of vehicle preferred by the customer 105, a seating preference of the customer 105, credit card information of the customer 105, and/or payment history of the customer 105.

Each of the autonomous vehicles that are a part of the fleet of cars operated by the ride service operator 115 includes a computer system, such as the computer system 136 in the autonomous vehicle 130. The computer system 136 may include several components such as a processor 137 and a memory 138. The memory 138, which is another example of a non-transitory computer-readable medium, may be used to store an operating system 146 and various other code modules such as a navigation system 139, a customer identification system 141, a parking system 142, a customer guidance system 143, and a communications module 144.

The various code modules may be configured to cooperate with various types of hardware provided in the autonomous vehicle 130 for carrying out various operations. For example, the parking system 142 may be coupled to the driving equipment (steering, brakes, accelerator etc.) of the autonomous vehicle 130.

The navigation system 139 may include software that cooperates with various types of hardware components mounted in the autonomous vehicle 130. A few examples of such hardware may include a sensing system 147 (video cameras, motion detectors, distance sensors, proximity sensors, audio sensors etc.) that may be used to guide the autonomous vehicle 130 safely through traffic such a mix of vehicles and pedestrians that may be encountered in a city. The navigation system 139 may further include route guidance equipment such as a Global Positioning System (GPS) system for guiding the autonomous vehicle 130 from a first location to a second location.

The customer identification system 141 may be used for example, to execute an automatic identification procedure for identifying the customer 105 when the autonomous vehicle 130 arrives at a pick-up location specified by the customer 105 to the ride service operator 115 when requesting a ride. The automatic identification procedure may involve the use of the communications module 144 to communicate with the customer 105. In one example implementation, the communications module 144 transmits a text message to the communication device 110 held by the customer 105. The text message may prompt the customer 105 to make a gesture, such as raising an arm or waving an arm. The sensing system 147 may be used to scan one or more areas around the autonomous vehicle 130 for detecting the gesture. Additional actions may then be taken to assist the customer 105 to enter the autonomous vehicle 130. A few examples of such actions are described below using other figures.

The parking system 142 may be coupled to the driving equipment (steering, brakes, accelerator etc.) of the autonomous vehicle 130 and used for identifying and parking in a suitable parking spot when picking up the customer 105. The parking spot may be identified by the autonomous vehicle 130 using various criteria such as proximity to the customer 105, no-parking zones, and/or a parking spot currently occupied by another vehicle.

The customer guidance system 143 may be used by the autonomous vehicle 130 to guide the customer 105 to the autonomous vehicle 130 when for example, the customer 105 is physically handicapped. Thus, when the customer 105 is visually impaired, the customer guidance system 143 may cooperate with the communications module 144 to transmit text messages to the communication device 110 held by the customer 105. The text messages may be transcribed into voice messages by a text-to-voice converter system provided in the communication device 110.

It must be understood that a memory device such as the memory 122, the memory 112, and/or the memory 138 shown in FIG. 1 can include anyone or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
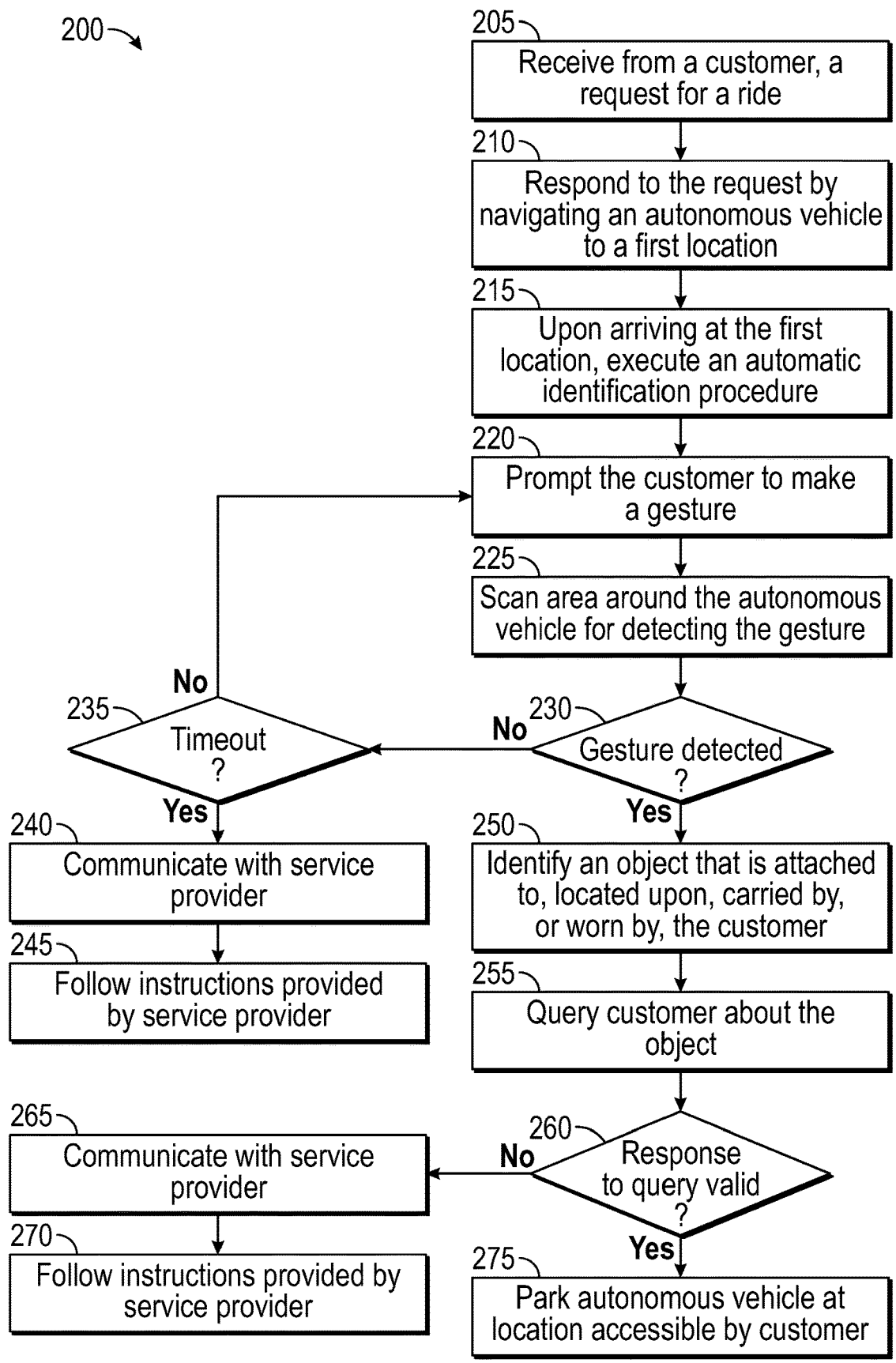
FIG. 2 shows a flowchart that illustrates an exemplary method in accordance with the disclosure for an autonomous vehicle to identify a customer upon arriving at a pick-up location.

FIG. 2 shows a flowchart 200 that illustrates an exemplary method in accordance with the disclosure for the autonomous vehicle 130 to identify the customer 105 upon arriving at a pick-up location specified by the customer 105. The flowchart 200 as well as other flowcharts disclosed herein, illustrate a sequence of operations that can be implemented in hardware, software, or a combination thereof. In the context of software, the operations represent computer-executable instructions stored on one or more non-transitory computer-readable media such as the memory 122, the memory 112, and/or the memory 138 that, when executed by one or more processors such as the processor 121, the processor 111 and/or the processor 137, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Block 205 pertains to receiving from the customer 105, a request for a ride. The communications device 110 may be used by the customer 105 to send in, or call in, the request to the ride service operator 115. Block 210 pertains to responding to the request by navigating the autonomous vehicle 130 to a pick-up location specified by the customer 105 to the ride service operator 115 and/or the autonomous vehicle 130. When the request is made to the ride service operator, the ride service operator 115 may use the computer system 116 to communicate with the computer system 136 in the autonomous vehicle 130 and configure the autonomous vehicle 130 to navigate to the pick-up location. The autonomous vehicle 130 may carry out various operations accordingly, and/or may carry out operations independently, such as by using a GPS system to travel to the pick-up location, using the customer identification system 141 to identify the customer 105, and/or using the parking system 142 to park the autonomous vehicle 130.

Block 215 pertains to the autonomous vehicle 130 using the computer system 136 to execute an automatic identification procedure to identify the customer 105 after the autonomous vehicle 130 has arrived at a first location. In one example situation, the first location may be a bit far from the pick-up location as a result of various conditions at the pick-up location such as a lack of parking spots. In another example situation, the first location may be curbside to the pick-up location specified by the customer 105.

Block 220 pertains to the autonomous vehicle 130 prompting the customer 105 to make a gesture so that the autonomous vehicle 130 can verify that the first location is the correct location for the pick-up, and/or that the customer 105 is present at or near the first location. In one example implementation, the communications module 144 transmits a text message to the communication device 110 held by the customer 105. The text message may prompt the customer 105 to make a gesture, such as raising an arm or waving an arm. In block 225, the autonomous vehicle 130 may use the sensing system 147 to scan one or more areas around the autonomous vehicle 130 for detecting the gesture.

Block 230 pertains to verifying if a gesture made by the customer 230 has been detected. The verification may be carried out by using the customer identification system 141. If, the autonomous vehicle 130 fails to detect the gesture made by the customer 105 a decision may be made by the autonomous vehicle 130 to wait for some time and send out one or more prompts to the customer 105 while waiting. This action is illustrated by block 235 wherein a determination is made if a waiting period has been exceeded. A timer (not shown) set to one of various times (five minutes, for example) may be used by the autonomous vehicle 130 to make the determination indicated in block 235. If the timer has not timed out, the autonomous vehicle 130 sends out another prompt to the customer 105 to make the gesture (as indicated in block 220) followed by the actions indicated in block 225 and block 230. On the other hand, if the timer has timed out, the autonomous vehicle 130 may use the computer system 136 to communicate with the computer system 116 to request instructions from the ride service operator 115 (as indicated in block 240). Then, as indicated in block 245, the autonomous vehicle 130 may follow instructions provided by the ride service operator 115. In one exemplary case, the ride service operator 115 may inform the autonomous vehicle 130 that the ride request by the customer 105 has been cancelled and the autonomous vehicle 130 reassigned to another ride task. In another exemplary case, the ride service operator 115 may instruct the autonomous vehicle 130 to continue to wait for a period of time as the customer 105 is running late. The autonomous vehicle 130 may obey this instruction by modifying the timer to provide another waiting period.

If, in block 230, the autonomous vehicle 130 detects the gesture made by the customer 105, the action indicated in block 250 is carried out. This action pertains to using the customer identification system 141 to further identify an object that is attached to, located upon, carried by, or worn by, the customer 105. A few examples of such an object are: an item of clothing worn by the customer, an accessory worn by the customer, or a smartphone displaying an image of an authorization code. The authorization code may be a linear barcode or a matrix barcode for example. In one exemplary implementation, the customer identification system 141 may identify that the customer 105 is wearing a red item of clothing. In another exemplary implementation, the customer identification system 141 may identify that the customer 105 is carrying a black handbag. In yet another exemplary implementation, the customer identification system 141 may identify that the customer 105 is accompanied by a seeing-eye dog.

Upon identifying the object, the autonomous vehicle 130 may transmit a query to the customer 105 about the object. For example, the autonomous vehicle 130 may use the communications module 144 to transmit the query to the communication device 110 held by the customer 105. The query may be directed at asking the customer 105 if the customer 105 is waiting for a ride and if so, to identify to the autonomous vehicle 130 the color of the item of clothing worn by the customer 105 (or the color of the handbag, the type of seeing-eye dog etc.).

Block 260 pertains to verifying whether a response to the query is valid response. If the response is valid (for example, the customer 105 indicates the color of the item of clothing to be red), the autonomous vehicle 130 proceeds to parking the autonomous vehicle 130 at a parking spot that is accessible by the customer 105 (as indicated by block 275). If, the response is invalid or incorrect, the autonomous vehicle 130 may use the computer system 136 to communicate with the computer system 116 to request instructions from the ride service operator 115 (as indicated in block 265). Then, as indicated in block 270, the autonomous vehicle 130 may follow instructions provided by the ride service operator 115.

Figure 3:
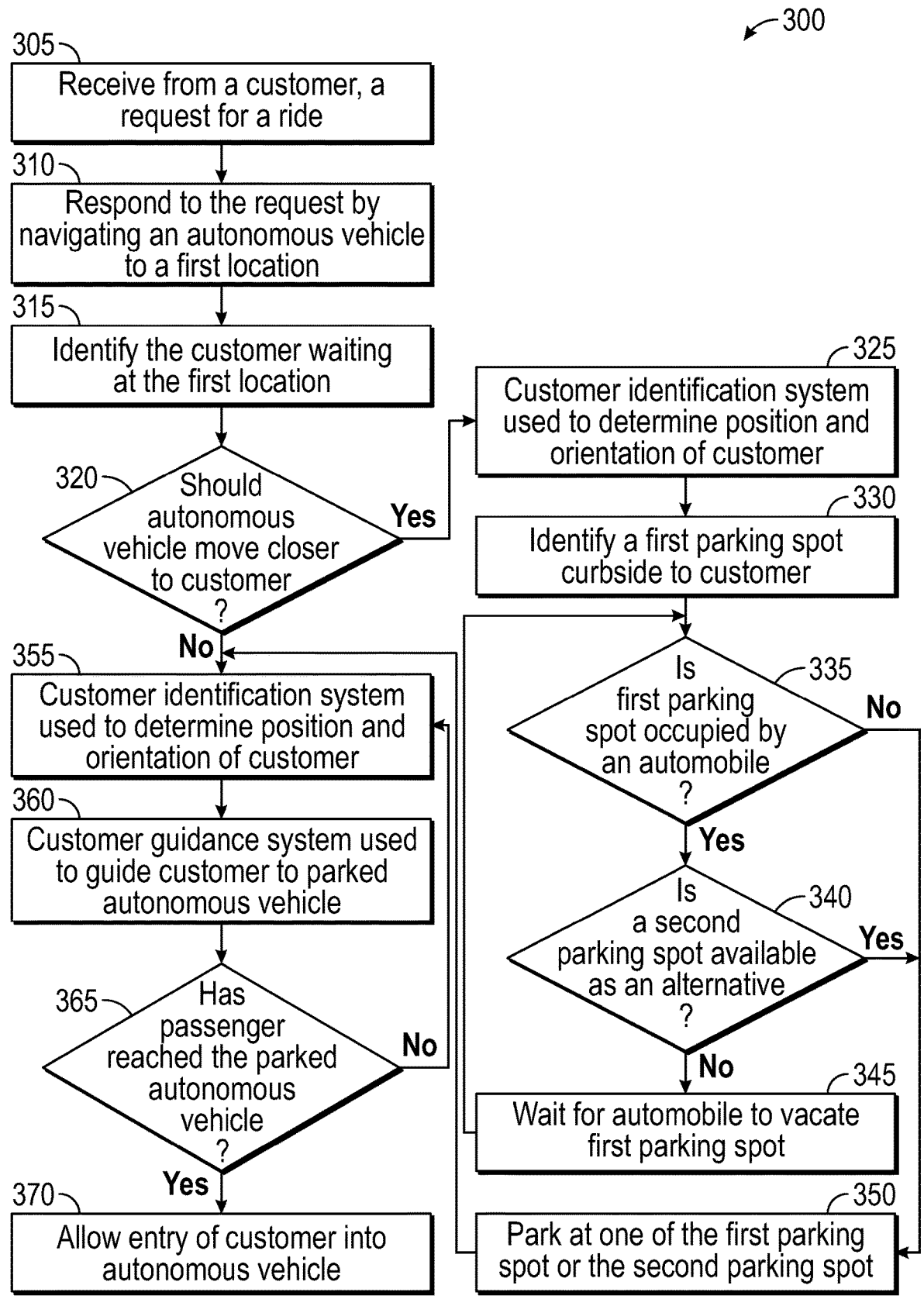
FIG. 3 shows a flowchart that illustrates an exemplary method in accordance with the disclosure for an autonomous vehicle to find a parking spot and guide the customer to the autonomous vehicle.

FIG. 3 shows a flowchart 300 that illustrates an exemplary method in accordance with the disclosure for the autonomous vehicle 130 to find a parking spot and guide the customer 105 to the autonomous vehicle 130. Block 305 pertains to receiving from the customer 105, a request for a ride. The communications device 110 may be used by the customer 105 to send in, or call in, the request to the ride service operator 115. Block 310 pertains to responding to the request by navigating the autonomous vehicle 130 to a pick-up location specified by the customer 105 to the ride service operator 115 and/or the autonomous vehicle 130. The response to the request may be carried out in some cases by the ride service operator 115 using the computer system 116 to communicate with the computer system 136 in the autonomous vehicle 130 to configure the autonomous vehicle 130 to navigate to the pick-up location. The autonomous vehicle 130 may also carry out various operations independent of the computer system 116, such as using a GPS system to travel to the pick-up location, using the customer identification system 141 to identify the customer 105, and/or using the parking system 142 to park the autonomous vehicle 130.

Block 315 pertains to the autonomous vehicle 130 using the computer system 136 to execute an automatic identification procedure to identify the customer 105 after the autonomous vehicle 130 has arrived at a first location. Upon identifying the customer 105, a determination is made in block 320 whether the autonomous vehicle 130 should move closer to the customer 105. The determination may be made in part by the autonomous vehicle 130 by using the sensing system 147 (video cameras, distance sensors, proximity sensors, audio sensors etc.) to detect a distance between the customer 105 and the autonomous vehicle 130. If the detected distance between the customer 105 and the autonomous vehicle 130 is significant, the autonomous vehicle 130 may use the customer identification system 141 to determine a position and an orientation of the customer 105, as indicated in block 325.

Block 330 pertains to the autonomous vehicle 130 identifying a first parking spot curbside to the customer 105. The autonomous vehicle 130 may execute this action by determining a perpendicular path between the customer 105 and a spot in the curb that is closest to the customer 105. After identifying the first parking spot, the autonomous vehicle 130 may determine if the first parking spot is occupied by an automobile (as indicated by block 335). If the first parking spot is occupied by an automobile, a determination is made in block 340 whether a second parking spot is available as an alternative. If a second parking spot is not available, the autonomous vehicle 130 may wait for the automobile that is parked in the first parking spot to vacate the first parking spot. This operation is indicated in block 345.

If in block 335, it is determined that the first parking spot is available, the autonomous vehicle 130 may park in the first parking spot. Alternatively, if in block 340, it is determined that the second parking spot is available, the autonomous vehicle 130 may park in the second parking spot. The parking operation in either the first parking spot or the second parking spot is indicated in block 350.

As indicated above, a determination is made in block 320 whether the autonomous vehicle 130 should move closer to the customer 105. The autonomous vehicle 130 may use a variety of parameters to make this determination. Some examples of such parameters may include a distance between the customer 105 and an available parking spot, a distance between the autonomous vehicle 130 and a spot at which the autonomous vehicle 130 is currently parked, and/or a nature of a physical impairment of the customer 105.

If the in block 320 it is determined that it is unnecessary for the autonomous vehicle 130 to move closer to the customer 105, the autonomous vehicle 130 may use the customer identification system 141 to determine a position and an orientation of the customer 105 (as indicated in block 355). Block 360 pertains to the autonomous vehicle 130 using the customer guidance system 143 to guide the customer 105 to the autonomous vehicle 130. Block 365 pertains to determining whether the customer 105 has reached the autonomous vehicle 130. If the customer 105 has not reached the autonomous vehicle 130, the autonomous vehicle 130 may once again use the customer identification system 141 to determine a position and an orientation of the customer 105 (as indicated in block 355), followed by reiteratively executing the actions indicated in block 360, block 365, and block 355. On the other hand, if the customer 105 has reached the autonomous vehicle 130, the autonomous vehicle 130 may allow entry of the customer 105 into the autonomous vehicle 130 (as indicated in block 370).

Figure 4:
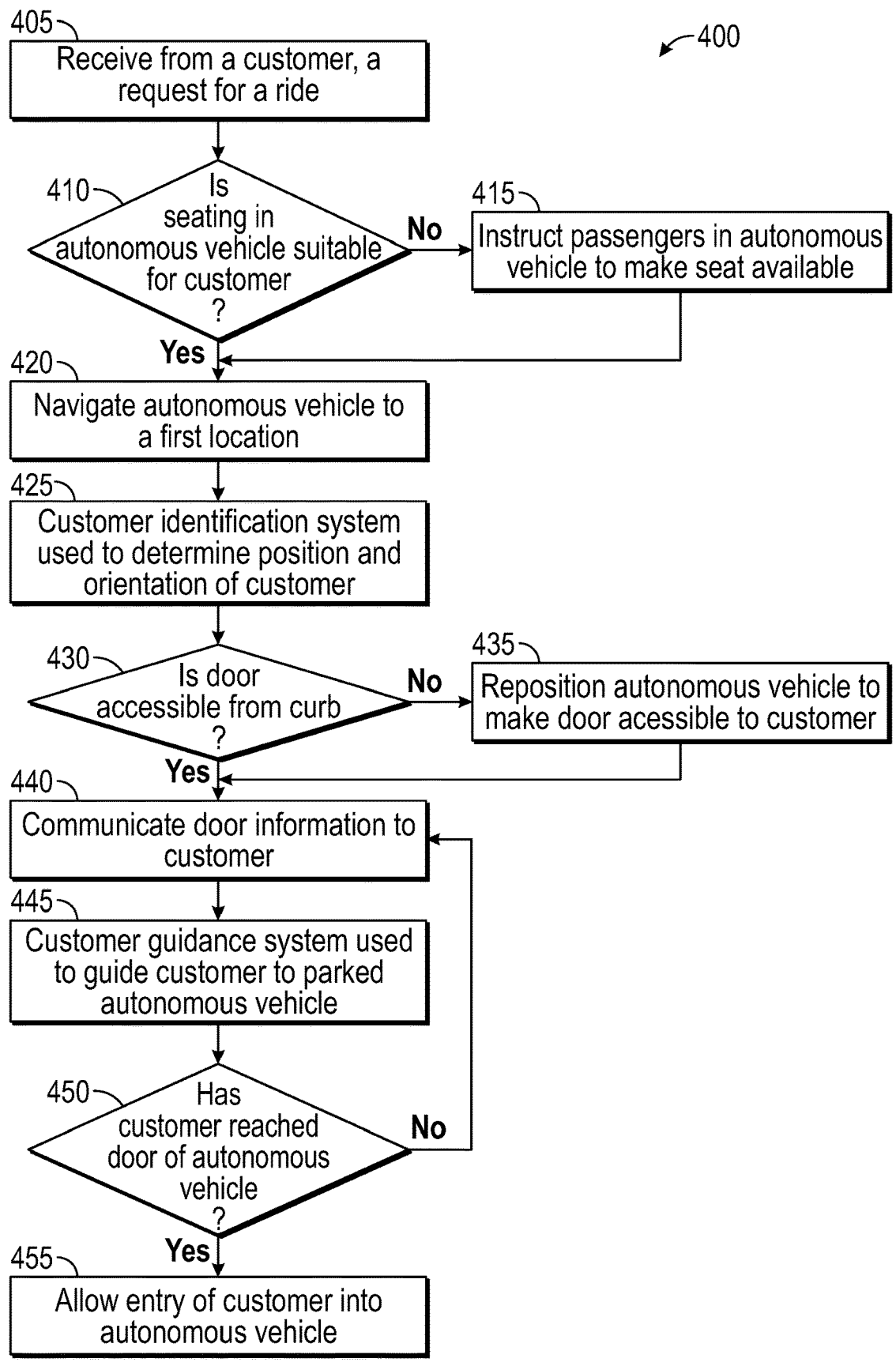
FIG. 4 shows a flowchart that illustrates an exemplary method in accordance with the disclosure for an autonomous vehicle to position a door of the autonomous vehicle to facilitate entry of the customer into the autonomous vehicle.

FIG. 4 shows a flowchart 400 that illustrates an exemplary method in accordance with the disclosure for the autonomous vehicle 130 to position a door of the autonomous vehicle 130 to facilitate entry of the customer 105 into the autonomous vehicle 130. Block 405 pertains to receiving from the customer 105, a request for a ride. The request may be originated by the customer 105 using the communications device 110 to send in, or call in, the request to the ride service operator 115. Block 410 pertains to responding to the request by determining if a seating arrangement in the autonomous vehicle 130 is suitable for the customer 105. Some examples of this action may include determining if a type of the autonomous vehicle 130 (two-door car, four-door car, van, sports utility vehicle, minibus etc.) is suitable for the customer 105, determining features of the autonomous vehicle 130 that may help the customer 105 when the customer 105 has a physical impairment (wheelchair ramp, height of vehicle etc.), and/or a type of seats provided in the autonomous vehicle 130 (bench seats, bucket seats, two-row seats etc.). Determining if a seating arrangement in the autonomous vehicle 130 is suitable for the customer 105 may further involve determining if a passenger is currently present in the autonomous vehicle 130 and is sitting in a specific seat (for example, a seat located next to a passenger side door of the autonomous vehicle 130).

If a passenger is sitting in the specific seat, the autonomous vehicle 130 may use an audio system of the autonomous vehicle 130 to instruct the passenger to vacate the seat (for example, by moving from a first seat to a second seat in the autonomous vehicle 130) and make the seat available for use by the customer 105. This operation is indicated in block 415. Block 420 pertains to navigating the autonomous vehicle 130 to a pick-up location specified by the customer 105. Upon reaching the pick-up location, the autonomous vehicle 130 may use the customer identification system 141 to identify and to determine a position and an orientation of the customer 105 (as indicated in block 425).

Block 430 pertains to the autonomous vehicle 130 making a determination whether a specific door is accessible to the customer 105 from the curb. The specific door may be specified on the basis of various factors such as the door being a rear passenger door, a door having a wheelchair access, and/or a door configured for use by the customer 105 when the customer 105 is a physically handicapped individual. If the determination in block 430 indicates that the specific door in not accessible to the customer 105 from the curb, the autonomous vehicle 130 repositions itself to make the specific door accessible to the customer 105 from the curb. The repositioning operation is indicated in block 435.

If the determination in block 430 indicates that the specific door is accessible to the customer 105 from the curb, the autonomous vehicle 130 communicates door information to the customer 105 (as indicated in block 440). Alternatively, the autonomous vehicle 130 communicates door information to the customer 105 after carrying out the operation indicated in block 435 (i.e., repositioning the autonomous vehicle 130 to make the specific door accessible to the customer 105 from the curb).

After communicating door information to the customer 105, the autonomous vehicle 130 operates the customer guidance system 143 to guide the customer 105 to the parked autonomous vehicle 130 (as indicated in block 445). Block 450 pertains to determining whether the customer 105 has reached the autonomous vehicle 130. If the customer 105 has not reached the autonomous vehicle 130, the autonomous vehicle 130 may reiteratively execute the actions indicated in block 445, 450, and 440. On the other hand, if the customer 105 has reached the autonomous vehicle 130, the autonomous vehicle 130 may allow entry of the customer 105 into the autonomous vehicle 130 (as indicated in block 455). In one exemplary embodiment, one or more tactile labels may be provided upon the autonomous vehicle to assist the customer 105 enter the autonomous vehicle 130 when the customer 105 is a visually impaired customer. For example, labels in Braille may be provided upon one or more door handles to assist the customer 105, when the customer 105 is a visually-impaired customer.

Figure 5:
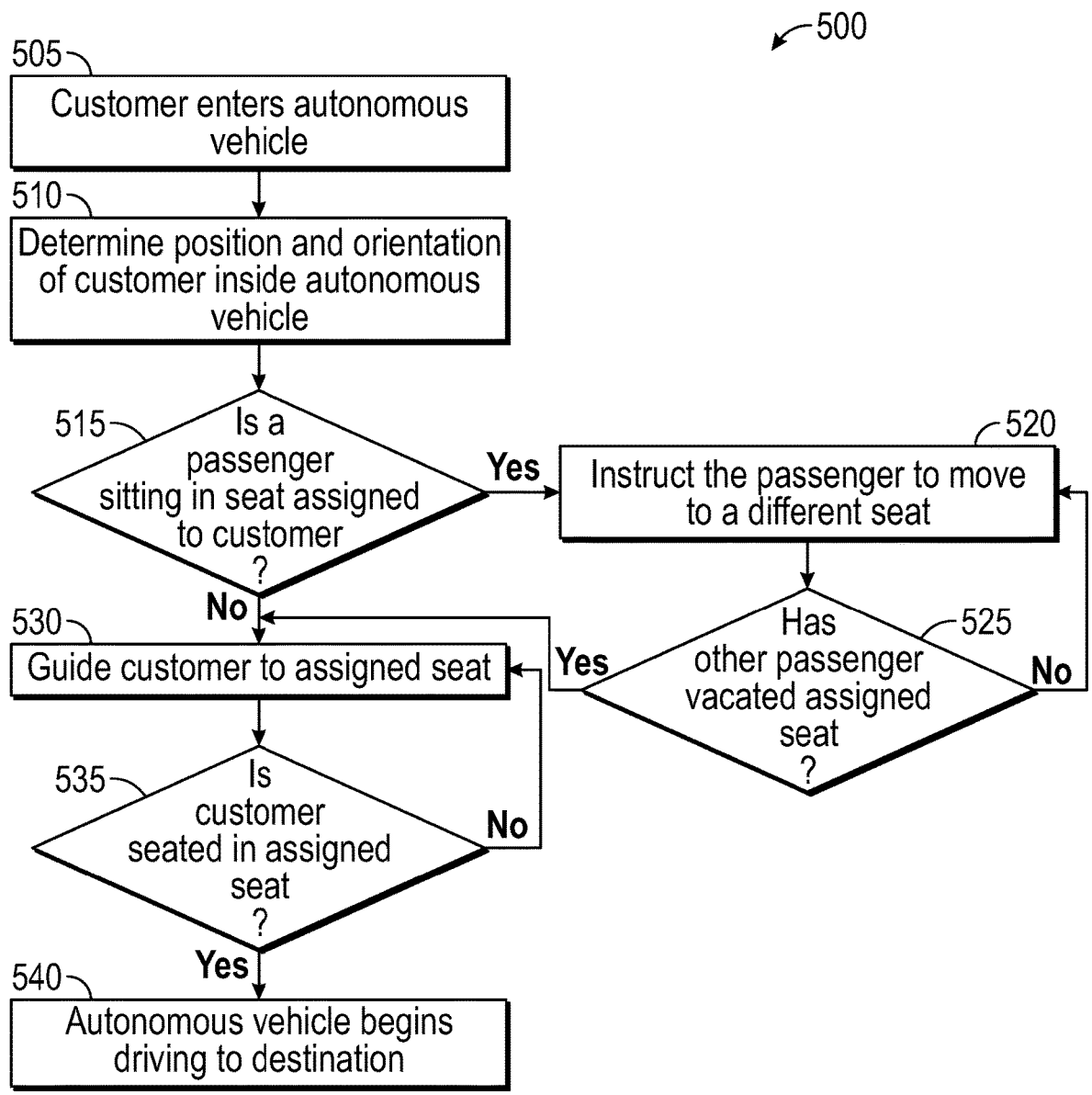
FIG. 5 shows a flowchart that illustrates an exemplary method in accordance with the disclosure for an autonomous vehicle to provide an assigned seat to the customer upon entry into the autonomous vehicle.

FIG. 5 shows a flowchart 500 that illustrates an exemplary method in accordance with the disclosure for the autonomous vehicle 130 to provide an assigned seat to the customer 105 upon entry into the autonomous vehicle 130. As indicated in block 505, the customer 105 enters the autonomous vehicle 130. Block 510 pertains to the autonomous vehicle 130 determining a position and/or an orientation of the customer 105 inside the autonomous vehicle 130. This action may be carried out by the autonomous vehicle 130 using one or more cameras and/or sensors provided inside the autonomous vehicle 130. Block 515 pertains to the autonomous vehicle 130 determining if a passenger in the autonomous vehicle 130 is sitting in a seat that is assigned to the customer 105. If a passenger is sitting in a seat that is assigned to the customer 105, the autonomous vehicle 130 instructs the passenger to move to a different seat (as indicated in block 520. The instruction may be provided over an audio system of the autonomous vehicle 130. Block 525 pertains to the autonomous vehicle 130 determining if the passenger has vacated the assigned seat. If the passenger has not vacated the assigned seat, the autonomous vehicle 130 reiteratively executes the actions indicated in block 520 and block 525. On other hand, if the passenger has vacated the assigned seat, the autonomous vehicle 130 guides the customer 105 to the assigned seat (as indicated in block 530). This action may be carried out by using the audio system inside the autonomous vehicle 130 to provide oral instructions to the customer 105 when the customer 105 is visually impaired.

Block 535 pertains to making a determination if the customer 105 is seated in the assigned seat. If not yet seated, the actions indicated in block 535 and block 530 may be carried out reiteratively. When doing so, the oral instructions may be repeated or supplemented with additional oral instructions to guide the customer 105 to the assigned seat. If it is determined that the customer 105 is seated in the assigned seat (block 535), the autonomous vehicle 130 begins driving (as indicated in block 540) to one or more destinations for one or more passengers riding in the autonomous vehicle 130, including a destination specified by the customer 105.

Example Embodiments

Example 1 may include a method comprising: receiving, by one or more computers coupled to at least one memory, a request for a ride from a user device; responding to the request by navigating an autonomous vehicle to a pick-up location; executing, upon arriving at the pick-up location, an automatic identification procedure comprising: prompting a user associated with the user device to make a gesture; scanning one or more areas around the autonomous vehicle for detecting the gesture; identifying, upon detecting the gesture, an object that is one of attached to, located upon, carried by, or worn by, the user; and verifying an association between the object and the user; and parking, upon verifying the association, the autonomous vehicle at one of a first location or a second location, the one of the first location or the second location accessible by the user for entering the autonomous vehicle.

Example 2 may include the method of example 1, wherein the user is a physically handicapped individual, and the object is one of an item of clothing worn by the user, an accessory worn by the user, or a smartphone displaying an image of an authorization code.

Example 3 may include the method of example 2 and/or some other example herein, wherein the authorization code is one of a linear barcode or a matrix barcode.

Example 4 may include the method of example 3 and/or some other example herein, wherein the linear barcode is a universal product code (UPC) and the matrix barcode is a quick response (QR) code.

Example 5 may include the method of example 1 and/or some other example herein, wherein verifying the association between the object and the user comprises: transmitting a query to the user, the query comprising a request to verify that the object is one of attached to, located upon, or worn by, the user; and confirming a validity of a response provided by the user.

Example 6 may include the method of example 1 and/or some other example herein, wherein verifying the association between the object and the user comprises: transmitting a query to the user, the query comprising a request to describe at least one feature of the object that is one of attached to, located upon, or worn by, the user; and confirming a validity of a response provided by the user.

Example 7 may include the method of example 6 and/or some other example herein, wherein the object is an item of clothing worn by the user and the at least one feature is a color of the item of clothing.

Example 8 may include a method comprising: receiving, by one or more computers coupled to at least one memory, a request for a ride from a customer device associated with a user; responding to the request by navigating an autonomous vehicle to a pick-up location; identifying the user waiting at the pick-up location; detecting an automobile parked at a first parking spot that is curbside to the pick-up location; monitoring the first parking spot for a first period of time to detect a vacating of the first parking spot by the automobile; and parking the autonomous vehicle at the first parking spot upon detecting the vacating of the first parking spot by the automobile during the first period of time.

Example 9 may include the method of example 8, wherein monitoring the first parking spot for the first period of time comprises one of keeping the autonomous vehicle in motion over the first period of time or parking the autonomous vehicle at a second parking spot over the first period of time.

Example 10 may include the method of example 9 and/or some other example herein, further comprising: parking the autonomous vehicle at one of the second parking spot or a third parking spot upon detecting the automobile parked at the first parking spot beyond the first period of time.

Example 11 may include the method of example 8 and/or some other example herein, wherein the customer is a physically handicapped individual and the method further comprises: determining a first passenger side door for entry of the physically handicapped individual into the autonomous vehicle; and providing instructions to the physically handicapped individual for guiding the physically handicapped individual to the first passenger side door of the autonomous vehicle.

Example 12 may include the method of example 11 and/or some other example herein, wherein the physically handicapped individual is a visually impaired passenger and the method further comprises: providing instructions to one or more passengers inside the autonomous vehicle to keep vacant a first seat located next to the first passenger side door.

Example 13 may include the method of example 12 and/or some other example herein, wherein providing instructions to the one or more passengers inside the autonomous vehicle comprises: identifying a first passenger seated in the first seat located next to the first passenger side door; and providing instructions to the first passenger to move from the first seat to a second seat inside the autonomous vehicle.

Example 14 may include the method of example 11 and/or some other example herein, wherein the physically handicapped individual is a visually impaired passenger and the method further comprises: providing on the autonomous vehicle, at least one tactile label that identifies the first passenger side door of the autonomous vehicle.

Example 15 may include a system comprising: a navigation system for navigating an autonomous vehicle to a pick-up location; a customer identification system for executing an automatic identification procedure by the autonomous vehicle upon arriving at the pick-up location, the automatic identification procedure comprising: prompting a customer at the pick-up location to make a gesture; scanning one or more areas around the autonomous vehicle for detecting the gesture; identifying, upon detecting the gesture, an object that is one of attached to, located upon, carried by, or worn by, the customer; and verifying an association between the object and the customer; and a parking system for self-parking the autonomous vehicle at one of a first parking spot or a second parking spot, the one of the first parking spot or the second parking spot accessible by the customer for entering the autonomous vehicle.

Example 16 may include the system of example 15, wherein the customer is a physically handicapped individual, and the object is one of an item of clothing worn by the customer, an accessory worn by the customer, or a smartphone displaying an image of an authorization code.

Example 17 may include the system of example 16 and/or some other example herein, wherein the authorization code is one of a linear barcode or a matrix barcode.

Example 18 may include the system of example 15 and/or some other example herein, wherein the parking system is configured to detect an automobile parked at a first parking spot curbside to the pick-up location; monitor the first parking spot for a first period of time to detect a vacating of the first parking spot by the automobile; and self-park the autonomous vehicle at the first parking spot upon detecting the vacating of the first parking spot by the automobile during the first period of time.

Example 19 may include the system of example 15 and/or some other example herein, wherein the customer is a visually impaired customer and the system further comprises: a customer guidance system for guiding the visually impaired customer to a first passenger side door of the autonomous vehicle.

Example 20 may include the system of example 19 and/or some other example herein, further comprises at least one tactile label that identifies the first passenger side door of the autonomous vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving, by one or more computers coupled to at least one memory, a request for a ride from a user device;
    responding to the request by navigating an autonomous vehicle to a pick-up location;
    executing, upon arriving at the pick-up location, an automatic identification procedure comprising:
        prompting a user associated with the user device to make a gesture;
        scanning one or more areas around the autonomous vehicle for detecting the gesture;
        identifying, upon detecting the gesture, an object that is one of attached to, located upon, carried by, or worn by the user; and
        verifying an association between the object and the user, wherein verifying the association between the object and the user comprises:
            transmitting a query to the user, the query comprising a request to verify that the object is one of attached to, located upon, or worn by the user; and
            confirming a validity of a response provided by the user; and
    parking, upon verifying the association, the autonomous vehicle at one of a first location or a second location, the one of the first location or the second location accessible by the user for entering the autonomous vehicle.

2. The method of claim 1, wherein the user is a physically handicapped individual, and the object is one of an item of clothing worn by the user, an accessory worn by the user, or a smartphone displaying an image of an authorization code.

3. The method of claim 2, wherein the authorization code is one of a linear barcode or a matrix barcode.

4. The method of claim 3, wherein the linear barcode is a universal product code (UPC) and the matrix barcode is a quick response (QR) code.

5. A method comprising:
    receiving, by one or more computers coupled to at least one memory, a request for a ride from a user device;
    responding to the request by navigating an autonomous vehicle to a pick-up location;
    executing, upon arriving at the pick-up location, an automatic identification procedure comprising:
        prompting a user associated with the user device to make a gesture;
        scanning one or more areas around the autonomous vehicle for detecting the gesture;
        identifying, upon detecting the gesture, an object that is one of attached to, located upon, carried by, or worn by the user; and
        verifying an association between the object and the user, wherein verifying the association between the object and the user comprises:
            transmitting a query to the user, the query comprising a request to describe at least one feature of the object that is one of attached to, located upon, or worn by the user; and
            confirming a validity of a response provided by the user; and
    parking, upon verifying the association, the autonomous vehicle at one of a first location or a second location, the one of the first location or the second location accessible by the user for entering the autonomous vehicle.

6. The method of claim 5, wherein the object is an item of clothing worn by the user and the at least one feature is a color of the item of clothing.

* * * * *